Patented Aug. 26, 1952

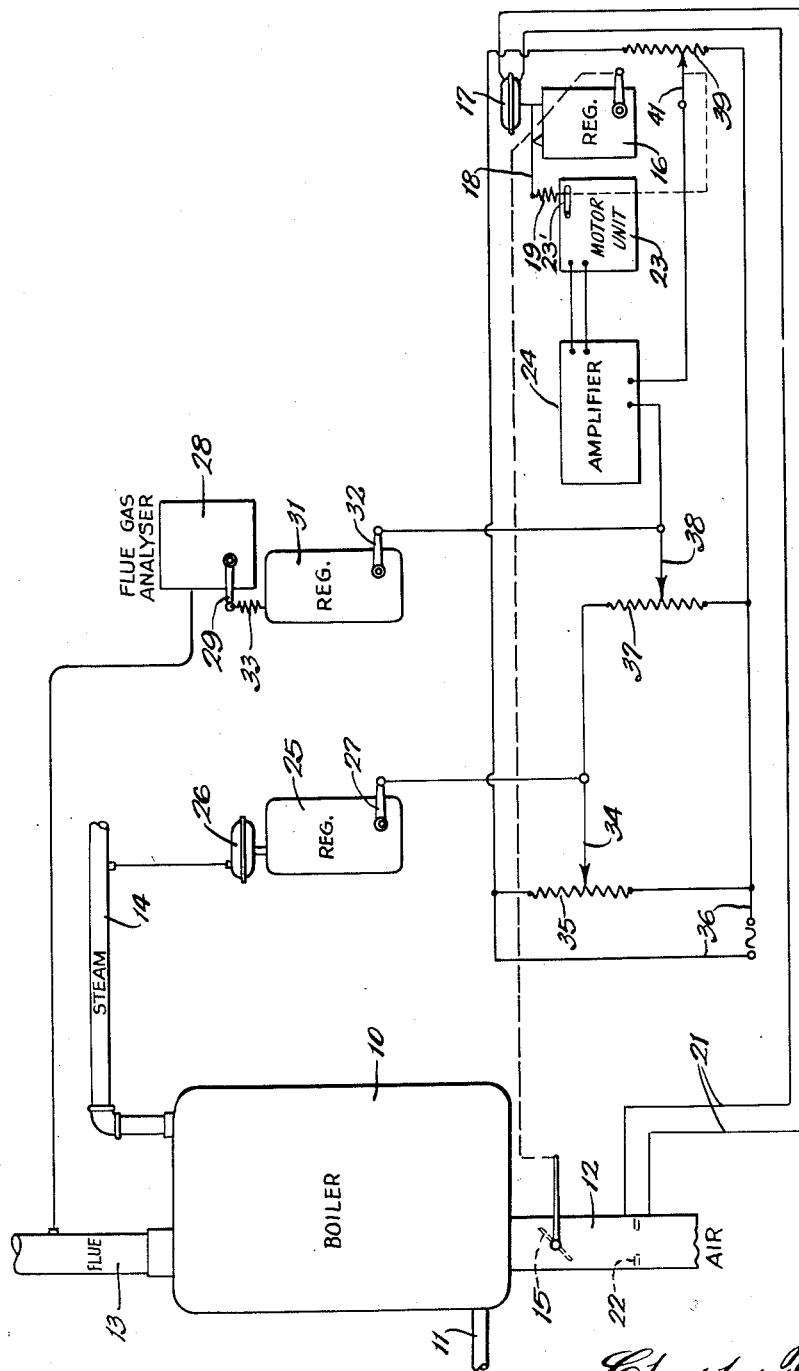

2,608,351

UNITED STATES PATENT OFFICE 2,608,351

CONTROL SYSTEM

Charles H. Smoot, Chicago, Ill., assignor to Republic Flow Meters Company, Chicago, Ill., a corporation of Illinois Application April 28, 1950, Serial No. 158,827

3 Claims. (Cl. 236—14)

This invention relates to control systems and more particularly to an electrically operated system for controlling a condition simultaneously affecting a plurality of separate conditions. As one example, the control system of the invention may be utilized to control the supply of combustion air to a steam generator in response to the steam flow or pressure and to the composition of the combustion gas.

One of the objects of the invention is to provide a control system in which a control operation is effected in response to the product of two factors indicative of two different conditions.

Another object is to provide a control system in which effects representative of two conditions are combined electrically to produce a product. In the preferred construction the effects are multiplied by two voltage varying devices connected in series to produce a resultant voltage proportional to the product of the effects.

Still another object is to provide a control system in which control is effected jointly in response to the product of two conditions and the value of a third condition affecting said two conditions to regulate the third condition.

The above and other objects and advantages of the invention will be more readily apparent when read in connection with the accompanying drawing, in which—

The single figure is a diagrammatic view of a control system embodying the invention as applied to a steam generator.

As illustrated, the system of the present invention is adapted to control the supply of one of the combustion products to a steam generator indicated at 10. Fuel may be supplied to the generator through an inlet conduit 11, and air for combustion may be supplied through an air inlet conduit 12. The products of combustion pass from the generator through a flue 13, and the generated steam is conducted from the generator through a header 14.

The supply of air for combustion is controlled by a valve 15 in the air inlet conduit 12 which is connected to a regulator 16 to adjust the valve. The regulator 16 may be of any desired type such, for example, as that more particularly disclosed in the patent to O'Connor, No. 2,039,924. This regulator is loaded by a diaphragm 17 acting on one end of a loading beam 18 and counterbalanced by a spring 19. In this construction the regulator will move the valve 15 jointly in response to the force of the diaphragm 17 and the force of the spring 19. The diaphragm 17 is responsive to the rate of supply of air to the generator, and for this purpose its opposite sides are connected through pipes 21 to the opposite sides of an orifice 22 in the air supply conduit.

The spring 19 is adjusted in response to two conditions of operation of the generator, both of which are affected by the rate of air supply. As shown, the spring 19 is moved by a reversible electric motor unit 23 having a movable arm 23' and which may be of the type more particularly described and claimed in my copending application Serial No. 94,010, filed May 18, 1949. The direction and extent of movement of the motor unit to vary the tension of the spring 19 is controlled in response to the phase and amplitude of the voltage supplied to the motor unit by an amplifier 24. In the construction illustrated, the amplifier is controlled in response to variations in a function of the steam generated in the generator and to the composition of the combustion gas.

To measure the function of the steam generated, a regulator 25 is provided having a control diaphragm 26 connected to the steam header 14 to respond to the steam pressure therein. The regulator includes a power operated arm 27 which is moved to a position proportional to the steam pressure.

The flue gas composition is measured by a flue gas analyzer 28 connected to the flue 13 to receive gas samples therefrom. The analyzer 28 includes an operating arm 29 which is moved in accordance with variations in the composition of the flue gas and which loads a regulator 31 similar to the regulator 25 and having a movable power operated output arm 32. As shown, the arm 29 of the flue gas analyzer varies the tension of a spring 33 which acts as the loading element for the regulator 31 so that the regulator output arm 32 will move to a position dependent upon the tension of the spring 33.

According to the present invention, the effects of the regulators 25 and 31 are combined electrically to control the motor unit 23 thereby to vary the tension of the spring 19. As shown, the regulator arm 27 is connected to a movable contact or wiper 34 which is movable over an impedance such as a resistance 35 connected across a source of power such as an alternating current circuit 36. The wiper 34 is connected to one end of an impedance 37 also shown as a resistance, the other end of which is connected to one side of the source 36. A movable wiper 38 engages the resistance 37 and is connected to the arm 32 of regulator 31 to be shifted thereby. The wiper 38 is connected to one of the input terminals of the amplifier 24.

To balance the system a third impedance shown as a resistance 39 is connected across the source 36 and has a movable wiper 41 thereon which is connected to the arm 23' of the motor unit 23 to be adjusted thereby. The wiper 41 is connected to the other input terminal of the amplifier 24.

With the system in balance, the potentiometer unit formed by the wiper 34 and resistance 35 will develop a voltage which is proportional to the position of the regulator arm 27 and is indirectly proportional to the pressure of steam in the header 14. This voltage will be impressed across the resistance 37, and the wiper 38 will derive from the resistance 37 a second voltage which is determined by the adjustment of the wiper 38. This is, in turn, proportional to the composition of the flue gas, and since the two resistance units are in series, the output voltage between the wiper 38 and the bottom line of the circuit 36 will be proportional to the products of the values of steam pressure and flue gas composition. With the air supply to the generator at the proper value, the motor unit 23 will have adjusted the wiper 41 so that its voltage is equal and opposite to the voltage at the wiper 38. As a result, the input voltage to the amplifier 24 will be zero, and the system will be stationary.

Upon a change in either the steam pressure or the flue gas composition, one or the other of the wipers 34 or 38 will be shifted to effect a change in the voltage at the wiper 38. Since this voltage is no longer equal to that at the wiper 41, an input voltage will be supplied to the amplifier 24 whose phase depends upon the direction of displacement of the voltages and whose amplitude is equal to the difference in the voltages. This input voltage will be amplified and supplied to the motor 23 to vary the tension of the spring 19 in an amount and a direction depending upon the direction and amount of deviation of the original condition from balance. At the same time the motor unit 23 will shift the wiper 41 in a direction to restore the voltage balance and will change in the tension of the spring 19 will cause the regulator 16 to move the valve 15 to change the air supply to the steam generator in a direction to restore the original condition to its desired value. For example, upon a drop in steam pressure the air supply will be increased, and the supply of fuel may be simultaneously increased to increase the rate of combustion, thereby to bring the pressure back to the desired value. Similarly, if the flue gas analyzer indicates an excess amount of free oxygen in the flue gas, the valve 15 will be closed slightly to reduce the air supply thereby to bring the amount of free oxygen in the flue gas back to the desired value. As the air flow increases or decreases, it will change the loading on the diaphragm 17 to balance the changed tension on the spring 19, thereby to rebalance the regulator 16. Also, if there should be any change in the air supply due to some external condition, the diaphragm 17 will adjust the regulator 16 to shift the valve 15 and bring the air supply back to the desired value. Thus, with the present system, control of the air to the steam generator is jointly responsive to the rate of air supply and to the product of factors representative of steam pressure and flue gas composition.

While the invention has been particularly described in connection with the control of a steam generator, it will be apparent that the principles thereof might be applied to various other types of control operations wherein one condition is to be controlled in response to the product of two or more other conditions. It is, therefore, not intended that the scope of the invention should be limited to the exact arrangement shown nor otherwise than by the terms of the appended claims.

What is claimed is:

1. A control system comprising an impedance connected across a source of voltage, an adjustable connection to the impedance to derive a variable voltage therefrom, a regulator responsive to a first condition to adjust the connection, a second impedance connected between the adjustable connection and one side of the source, a second adjustable connection to the second impedance, a second regulator responsive to a second condition to adjust the second connection, a third impedance connected across said source, a third adjustable connection to the third impedance, control means for a third condition affecting both of the first two named conditions, a regulator connected to the control means to control the third condition, loading means on the regulator responsive to the third condition, an electric motor unit responsive to the voltage between the second and third connections, a connection from the electric motor unit to the third connection to adjust it and a resilient connection between the motor means and the regulator to vary the loading of the regulator by the loading means.

2. A control system comprising a first variable electrical device to produce a variable voltage, a first regulator responsive to a first condition to adjust the first device, a second variable electrical device connected in series with the first device to vary the output voltage of the first device, a second regulator responsive to a second condition to control the second device, a third variable electrical device to produce a third variable voltage, control means for a third condition affecting both of the first two named conditions, and means jointly responsive to the third condition and the difference in the voltages produced at the second and third devices to adjust the third device and the control means.

3. A combustion control system for a steam generator comprising a first regulator responsive to a function of the steam generated by the boiler, a first variable electrical device adjusted by the regulator to produce a variable voltage, a second variable electrical device in series with the first device to vary the output voltage of the first device, a second regulator responsive to a function of the combustion in the generator to adjust the second device, a third variable electrical device, control means to control the supply of an element entering into combustion to the generator, and means jointly responsive to the difference in voltages produced at the second and third devices and to the rate of supply of said element to adjust the third device and the control means.

CHARLES H. SMOOT.

REFERENCES CITED

The following references are of record in the file of this patent:

UNITED STATES PATENTS

| Number | Name | Date |
|---|---|---|
| Re. 19,592 | Gibson | May 28, 1935 |
| 1,695,470 | Roucka | Dec. 18, 1928 |
| 1,949,736 | Bristol | Mar. 6, 1934 |

OTHER REFERENCES

"Electronics," August, 1946, pp. 110–113 (article by William Shannon).